(12) United States Patent  
Takeda

(10) Patent No.: US 7,192,169 B2  
(45) Date of Patent: Mar. 20, 2007

(54) BICYCLE LIGHTING APPARATUS

(75) Inventor: Kazuhiro Takeda, Sakai (JP)

(73) Assignee: Shimano, Inc., Sakai (JP)

( * ) Notice: Subject to any disclaimer, the term of this patent is extended or adjusted under 35 U.S.C. 154(b) by 94 days.

(21) Appl. No.: 10/605,528

(22) Filed: Oct. 6, 2003

(65) Prior Publication Data

US 2004/0105273 A1   Jun. 3, 2004

(30) Foreign Application Priority Data

Oct. 18, 2002  (EP) ............................. 02023393

(51) Int. Cl.  
*B62J 6/00* (2006.01)
(52) U.S. Cl. .................. 362/475; 362/194; 362/800
(58) Field of Classification Search .............. 362/473, 362/474, 476, 193, 194, 800, 475  
See application file for complete search history.

(56) References Cited

U.S. PATENT DOCUMENTS

| | | | | |
|---|---|---|---|---|
| 2,747,078 A | * | 5/1956 | Kennedy et al. .............. 362/22 |
| 3,792,307 A | * | 2/1974 | Baker .......................... 315/77 |
| 3,894,281 A | * | 7/1975 | Bloomfield .................... 322/1 |
| 4,974,124 A | * | 11/1990 | Wu ............................. 362/475 |
| 5,029,055 A | * | 7/1991 | Lindh .......................... 362/191 |
| 5,384,693 A | * | 1/1995 | Schwaller et al. ........... 362/473 |
| 5,446,628 A | * | 8/1995 | Blom et al. .................. 362/551 |
| 5,477,425 A | * | 12/1995 | Sun et al. ................... 362/476 |
| 5,690,410 A | * | 11/1997 | Lin ............................. 362/473 |
| 6,204,752 B1 | | 3/2001 | Kishimoto |
| 6,286,982 B1 | * | 9/2001 | Tashiro ....................... 362/474 |

FOREIGN PATENT DOCUMENTS

| | | |
|---|---|---|
| DE | 4337456 A1 | 5/1995 |
| DE | 201 15 816 U1 | 4/2002 |
| DE | 201 15 825 U1 | 4/2002 |
| EP | 904982 A3 | 3/1999 |
| JP | 07-329852 A | 12/1995 |
| JP | 2000-198477 A | 7/2000 |

* cited by examiner

*Primary Examiner*—Renee Luebke  
*Assistant Examiner*—Gunyoung T. Lee  
(74) *Attorney, Agent, or Firm*—James A. Deland

(57) ABSTRACT

A bicycle lighting apparatus comprises a computer housing adapted to be mounted to a bicycle, a computer housed within the computer housing, and an integrated lighting device that is controlled by the computer.

8 Claims, 8 Drawing Sheets

BICYCLE LIGHTING APPARATUS

BACKGROUND OF INVENTION

The present invention is directed to bicycles and, more particularly, to a bicycle lighting apparatus that may be used for illuminating bicycle components and/or the area around the bicycle.

Cycle computers and lighting devices often are provided as independent add-on features for bicycles. Cycle computers usually are detachably mounted on the bicycle handlebar, wherein the cycle computer gathers and displays information related to bicycle speed, cadence, distance travelled, and the like. For example, a magnet may be mounted to a wheel spoke or to some other rotating element, and a magnet sensor may be mounted to sense each passing of the magnet and provide corresponding electrical pulses. The electrical pulses can be used to calculate various parameters that are displayed to the cyclist. Some modern cycle computers have been designed to display information related to the state of the bicycle transmission as well. Unfortunately, such cycle computers usually are independently battery powered and are not adapted to interact with other bicycle components.

Lighting devices often are provided to illuminate the riding surface in front of the bicycle. Conventional lighting devices often were powered by a dynamo that contacted the bicycle tire. One problem with such lighting devices is that light intensity was directly proportional to the cycling speed. Thus, there was no illumination unless the bicycle was moving, which adversely affected the rider's safety. Also, the dynamo added resistance to wheel rotation, thus requiring additional pedalling effort by the rider. Recently developed lighting devices are powered by rechargeable batteries and are removably mounted to the bicycle or worn by the rider. Thus, the rider may recharge the batteries at a convenient time. However, if the cyclist fails to thoroughly charge the battery, the lighting device may fail at an undesirable time.

German utility model publication DE 20115816 discloses a cellular phone having an integrated cycle computer with a display and a lighting device. The device is battery powered, so the function of the cycle computer, the lighting device and/or the cellular phone is limited accordingly. Furthermore, the disclosed device is nothing more than a mechanical combination of three independent devices in a common casing. There is no functional coupling or interaction between the different devices with the exception of the keyboard that may be used both for the cellular phone and for switching the light emitting means off and on. In any event, there is no flexibility in the lighting functions of any of the known devices.

SUMMARY OF INVENTION

The present invention is directed to various features of a bicycle lighting apparatus. In one embodiment, a bicycle lighting apparatus comprises a computer housing adapted to be mounted to a bicycle, wherein the computer housing includes a beveled portion; a computer housed within the computer housing; and a lighting device housed within the computer housing, wherein the lighting device is controlled by the computer. The lighting device is housed at the beveled portion of the computer housing so that light emitted by the lighting device is directed forwardly outside of the computer housing.

In another embodiment, a bicycle lighting apparatus comprises a computer housing adapted to be mounted to a bicycle; a computer housed within the computer housing; a display housed within the computer housing, wherein the computer controls the information provided on the display; and a lighting device housed within the computer housing, wherein the lighting device is controlled by the computer. The lighting device provides lighting for the display as well as lighting outside of the computer housing.

In another embodiment, a bicycle lighting apparatus comprises a computer housing adapted to be mounted to a bicycle; a computer housed within the computer housing; a display housed within the computer housing, wherein the computer controls the information provided on the display; and a lighting device housed within the computer housing, wherein the lighting device is controlled by the computer. Light emitted by the lighting device is directed laterally outside of the computer housing.

In another embodiment, a bicycle lighting apparatus comprises a computer housing adapted to be mounted to a bicycle; a computer housed within the computer housing; a lighting device housed within the computer housing for providing lighting outside of the computer housing, wherein the lighting device is controlled by the computer; a separate battery housing spaced apart from the computer housing; and wiring connecting the battery housing to the computer housing for providing power to the computer.

In another embodiment, a bicycle lighting apparatus comprises a computer housing adapted to be mounted to a bicycle; a computer housed within the computer housing; a separate battery housing spaced apart from the computer housing; wiring connecting the battery housing to the computer housing for providing power to the computer; and a lighting device disposed at the battery housing for providing lighting outside of the battery housing.

In another embodiment, a bicycle lighting apparatus comprises a computer housing adapted to be mounted to a bicycle; a computer housed within the computer housing; a first lighting device housed within the computer housing for providing lighting outside of the computer housing, wherein the first lighting device is controlled by the computer; a second lighting device spaced apart from the computer housing; and electrical wiring connecting the second lighting device to the computer housing.

Additional inventive features will become apparent from the description below, and such features alone or in combination with the above features may form the basis of further inventions as recited in the claims and their equivalents.

DETAILED DESCRIPTION

Figure 1:
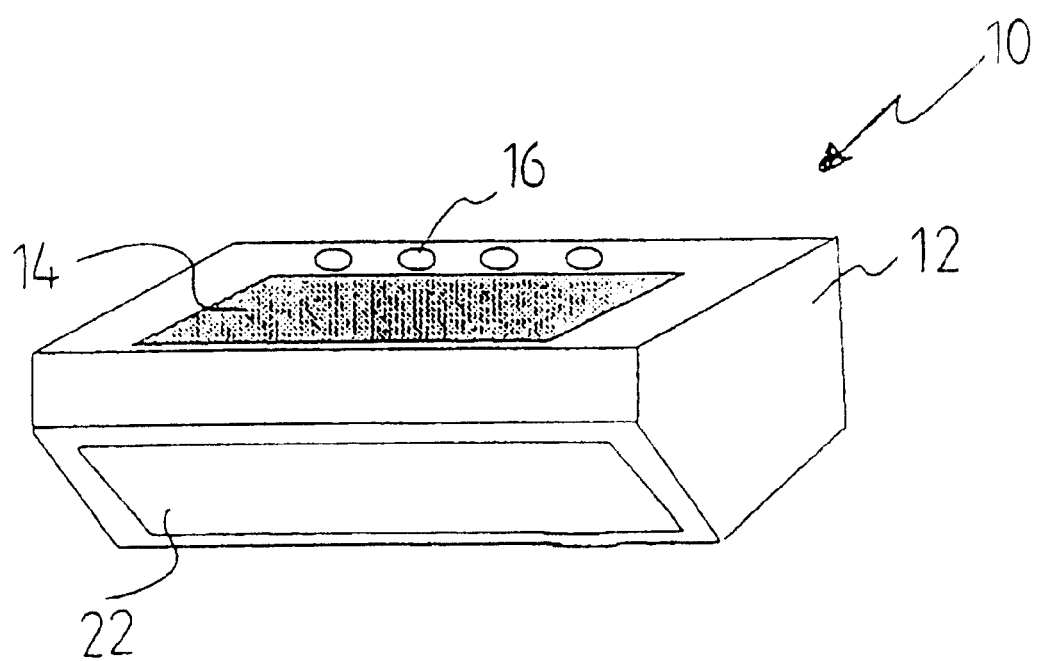
FIG. 1 shows a particular embodiment of a cycle computer with an integrated lighting device.
Figure 3:
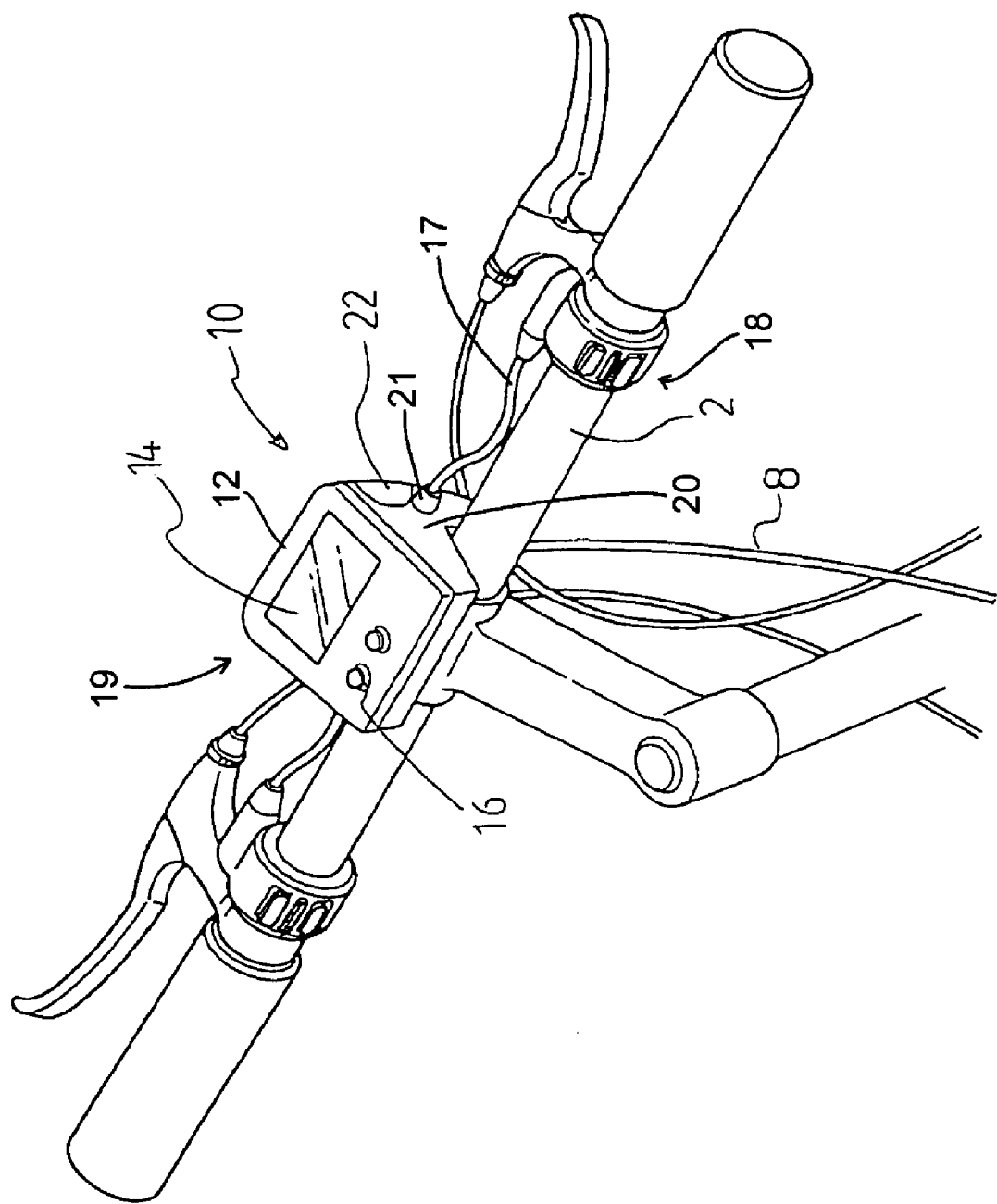
FIG. 3 shows components mounted to the bicycle handlebar.

FIG. 1 shows a particular embodiment of a cycle computer 10 with an integrated lighting device 22. The cycle computer 10 comprises a computer housing 12 with a display 14 on the upper surface and switch elements 16 for controlling the operation of the cycle computer 10. The front of the computer housing 12 has a bevelled or inclined portion in which a lighting device 22 for lighting the road or some other area outside of the computer housing 12 is mounted. In this embodiment, the lighting device 22 comprises a light bulb (not shown) behind a translucent window element. If desired, the light emitted by the light bulb also may be directed upwardly to provide back lighting of the display 14 to reduce cost and the number of parts. The lighting device 22 and display 14 are housed together with a computer 32 (FIGS. 7 and 8) in the common housing 12, and the components are functionally coupled to each other and may receive signals from an internal hub dynamo 7 via wiring 8 (FIG. 3). Using an internal hub dynamo 7 reduces pedalling effort, and such a dynamo is less affected by mud and moisture.

Figure 2:
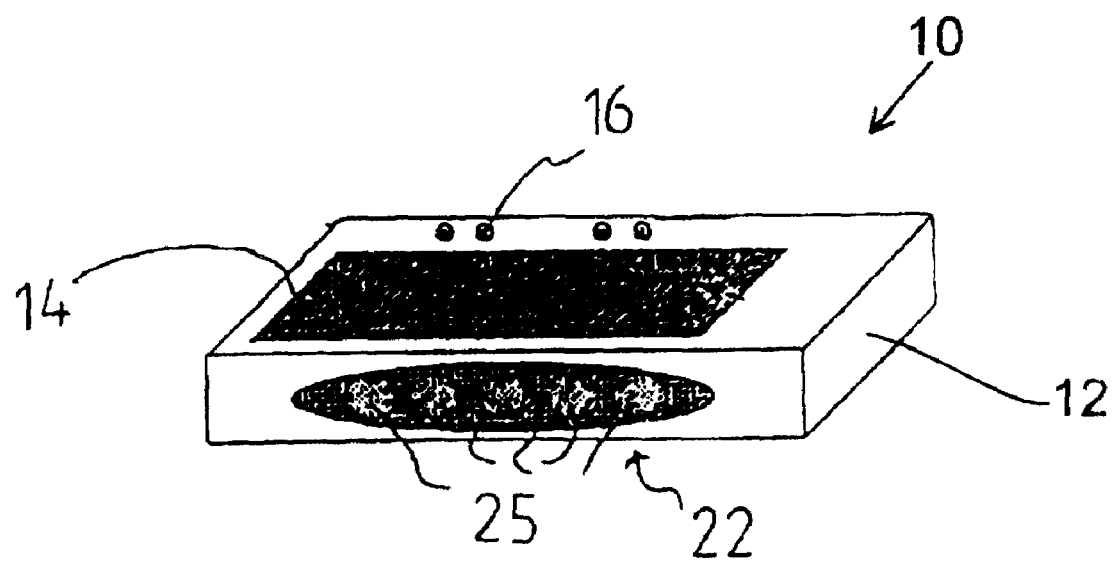
FIG. 2 shows another embodiment of a cycle computer with an integrated lighting device.

FIG. 2 shows another embodiment of a cycle computer 10 with an integrated lighting device 22. In this embodiment, the lighting device 22 comprises five light emitting diodes (LED's) 25. Furthermore, the LED's 25 are positioned on a forwardly directed front face rather than in a bevelled or inclined position. This embodiment is particularly suited for multiple illumination modes.

FIG. 3 shows how another embodiment of a cycle computer may be mounted onto a bicycle handlebar 2. Of course, the same mounting scheme could be used with the cycle computers shown in FIGS. 1 and 2. As shown in FIG. 3, the display 14 of the cycle computer 10 is directed towards the cyclist together with the switching elements 16 that operate the cycle computer 10 and/or the lighting device 22. In this embodiment, the lighting device 22 faces forwardly and extends onto the side surfaces of the cycle computer housing 12. This configuration provides forward and lateral illumination around the bicycle to facilitate viewing the road ahead as well as indicating sideways movement of the bicycle, thus improving rider safety. A conduit coupler 21 is disposed on a side surface 20 of a housing 19 of computer 10 for coupling a conduit 17 that contains electrical wiring for switches 18 mounted to handlebar 2.

Figure 4:
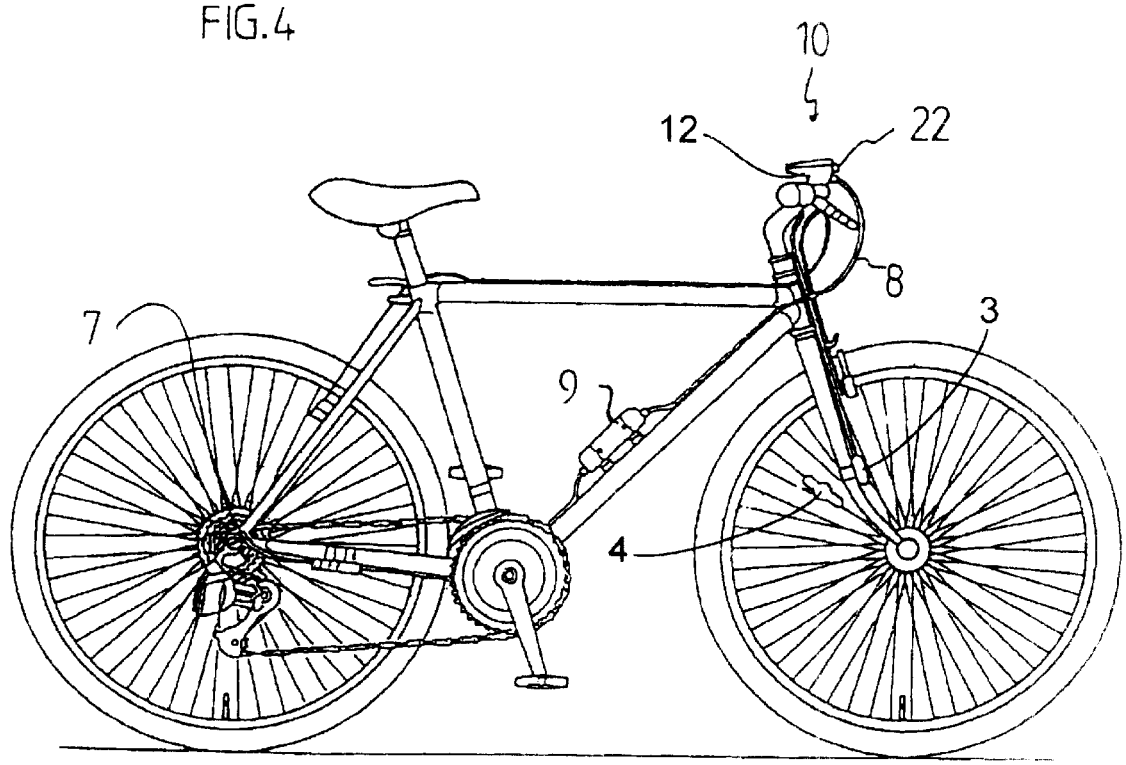
FIG. 4 is a side view of a particular embodiment of a bicycle that includes a cycle computer with an integrated lighting device.

FIG. 4 is a side view of another embodiment of a bicycle with a cycle computer 10 that includes an integrated lighting device 22. As shown therein, cycle computer 10 is connected by wiring 8 to a battery housing 9 that is fixed to the bicycle frame. The battery housing 9 is connected to a hub dynamo 7 that serves as a power generating means. In this embodiment, the hub dynamo 7 can provide signals that the cycle computer can use to calculate cycling parameters (e.g., speed) as well as signals used to charge a battery disposed in battery housing 9. Cycle computer 10 can be used to manage the charge status of the battery disposed in battery housing 9 in a known manner. If desired, a magnet 4 may be mounted to the front wheel, and a sensor element 3 may be mounted onto the bicycle fork. Sensor element 3 generates electrical pulses in response to each passage of magnet 4, and cycle computer 10 may use these signals in a known manner to calculate bicycle speed instead of or in addition to the signals provided by dynamo 7.

Figure 5:
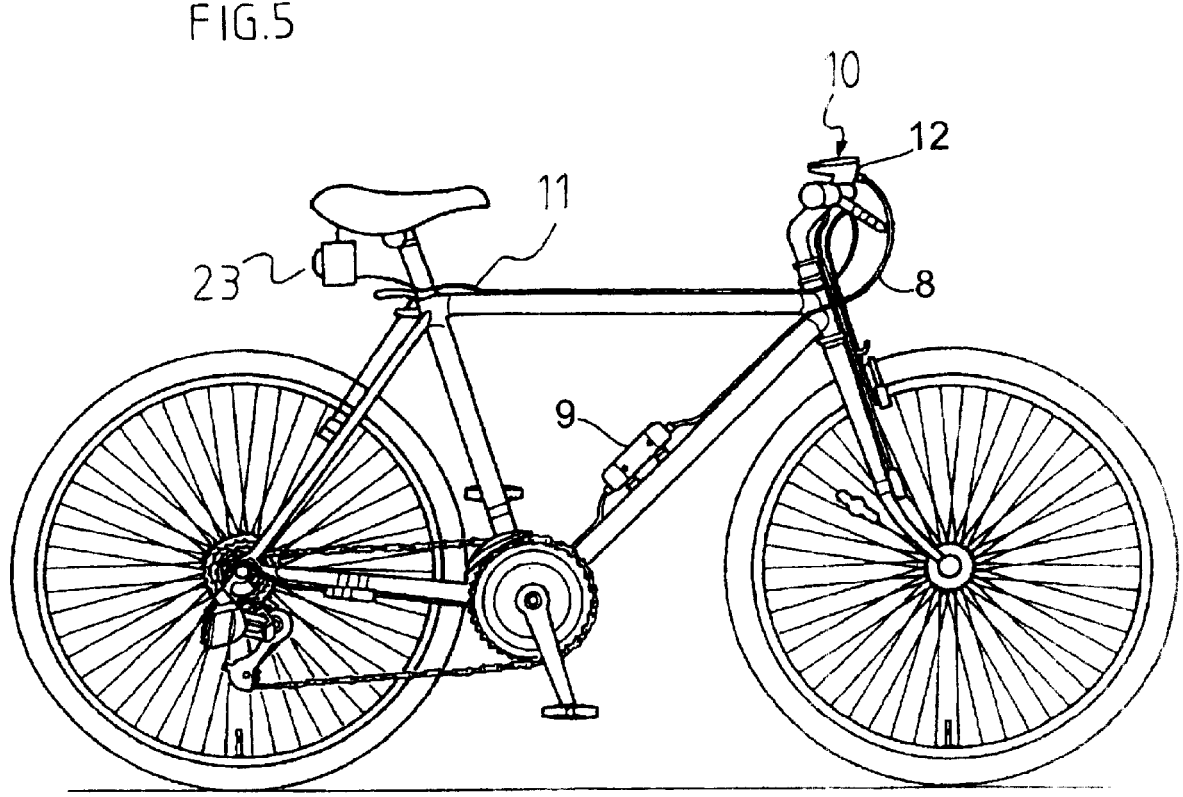
FIG. 5 is a side view of another embodiment of a bicycle that includes a cycle computer with an integrated lighting device.

FIG. 5 is a side view of another embodiment of a bicycle that includes a cycle computer 10 with an integrated lighting device. In this embodiment, additional or alternative lighting devices are provided to indicate the presence of the bicycle when viewed from behind. More specifically, a lighting device 23 is connected to the cycle computer 10 via wiring 11. As in the previous embodiments, the computer housing 12 of the cycle computer 10 serves as central control unit and houses a CPU for controlling the cycle computer functions, charging of the battery housed within battery housing 9, and the illumination of the various lighting devices.

Figure 6:
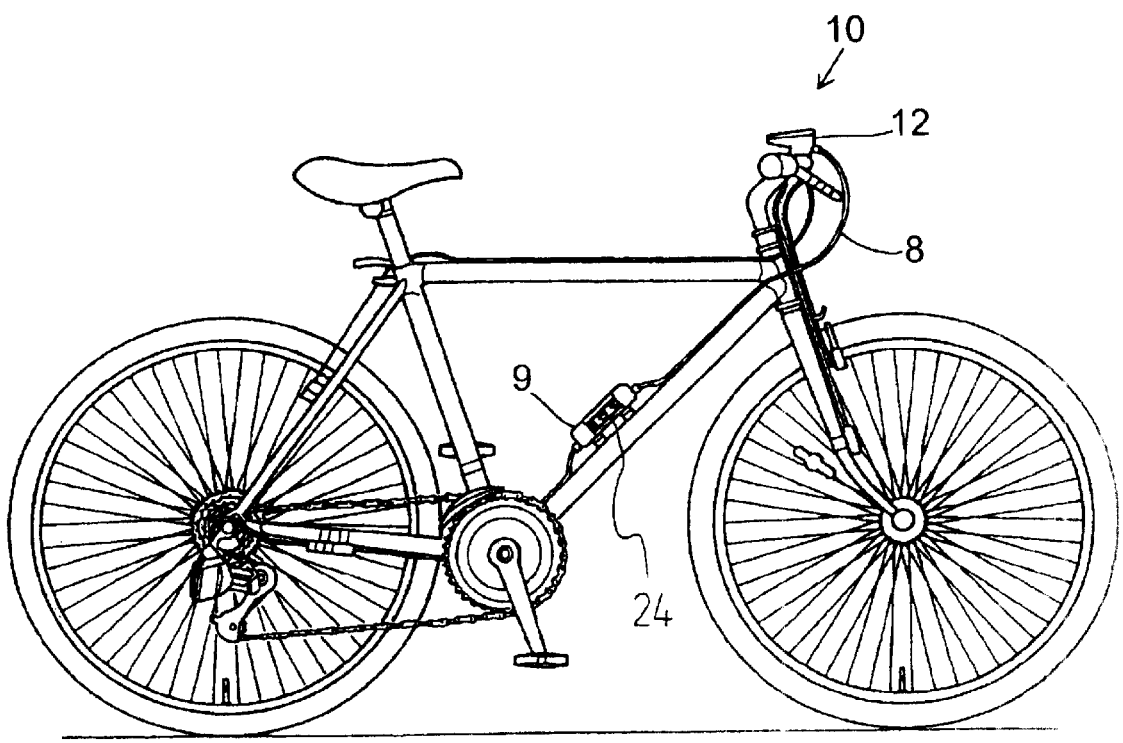
FIG. 6 is a side view of another embodiment of a bicycle that includes a cycle computer with an integrated lighting device.

FIG. 6 is a side view of another embodiment of a bicycle with a cycle computer 10 with an integrated lighting device 24. In this embodiment, lighting device 24 is disposed at the battery housing 9 to enhance visibility of the bicycle when viewed from the side. The other elements are substantially the same as in the previous embodiments.

Figure 7:
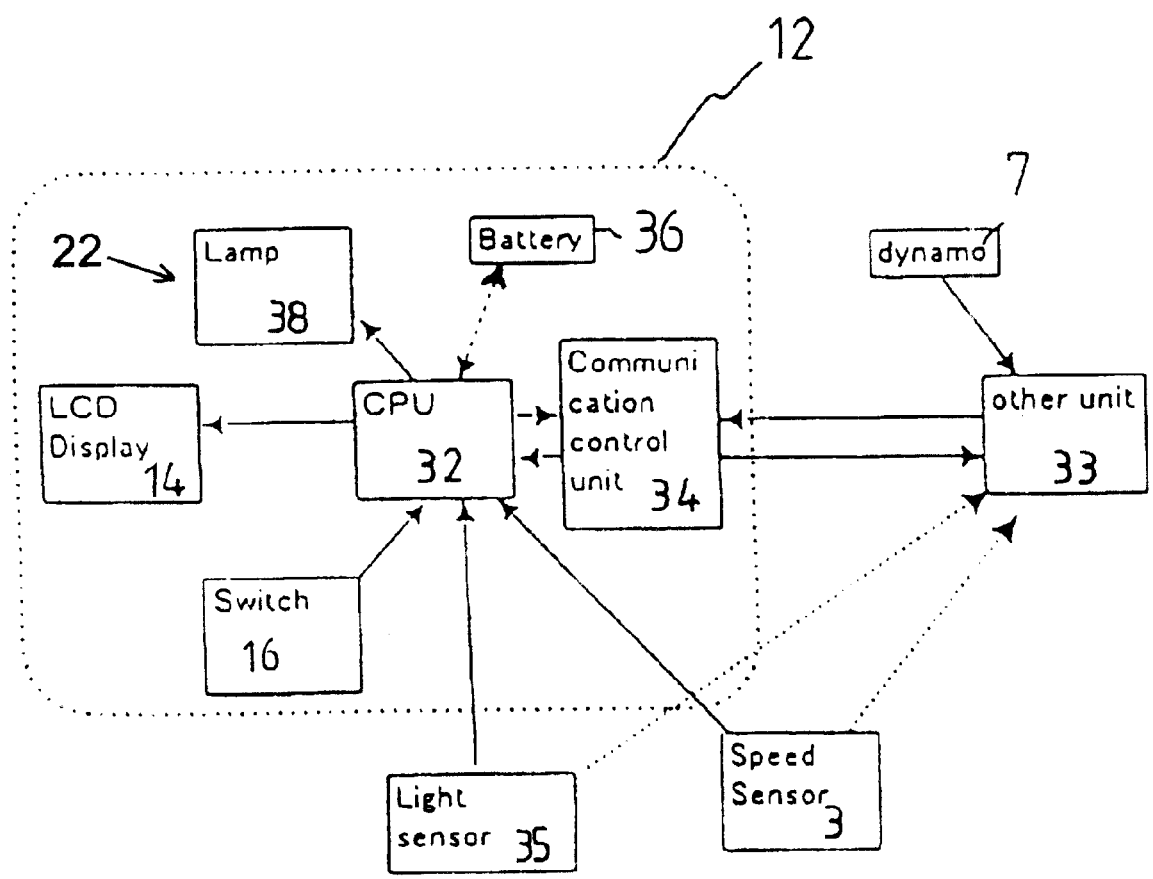
FIG. 7 is a block diagram of electrical components used with a particular embodiment of a cycle computer with an integrated lighting device.

FIG. 7 is a block diagram of electrical components used with a particular embodiment of a cycle computer 10 with an integrated lighting device 22. In this embodiment, computer housing 12 includes a central processing unit (CPU) 32, a battery 36 that can be housed within the housing 12 or in the separate housing 9 illustrated in FIGS. 4–6, LCD display 14, switching elements 16, a lamp 38 that comprises the lighting device 22, and a communication control unit 34. In order to perform various cycle computer functions and display results on LCD display 14, CPU 32 may be connected to signal generation means such as the speed sensor 3 either directly or indirectly through another unit 33 and communication control unit 34. CPU also may be connected to dynamo 7 through the other unit 33 and communication control unit 34, wherein dynamo 7 provides control signals and/or electrical power. CPU 32 can control the lamp 38 in response to switching signals provided by the switching elements 16 or in response to signals from a light sensor 35 that detects the ambient light level. CPU 32 may be connected to light sensor 35 either directly or indirectly through the other unit 33 and communication control unit 34. CPU 32 may display many types of data on LCD display 14, such as the riding status of the bicycle, battery or dynamo charge status, and so on.

Figure 8:
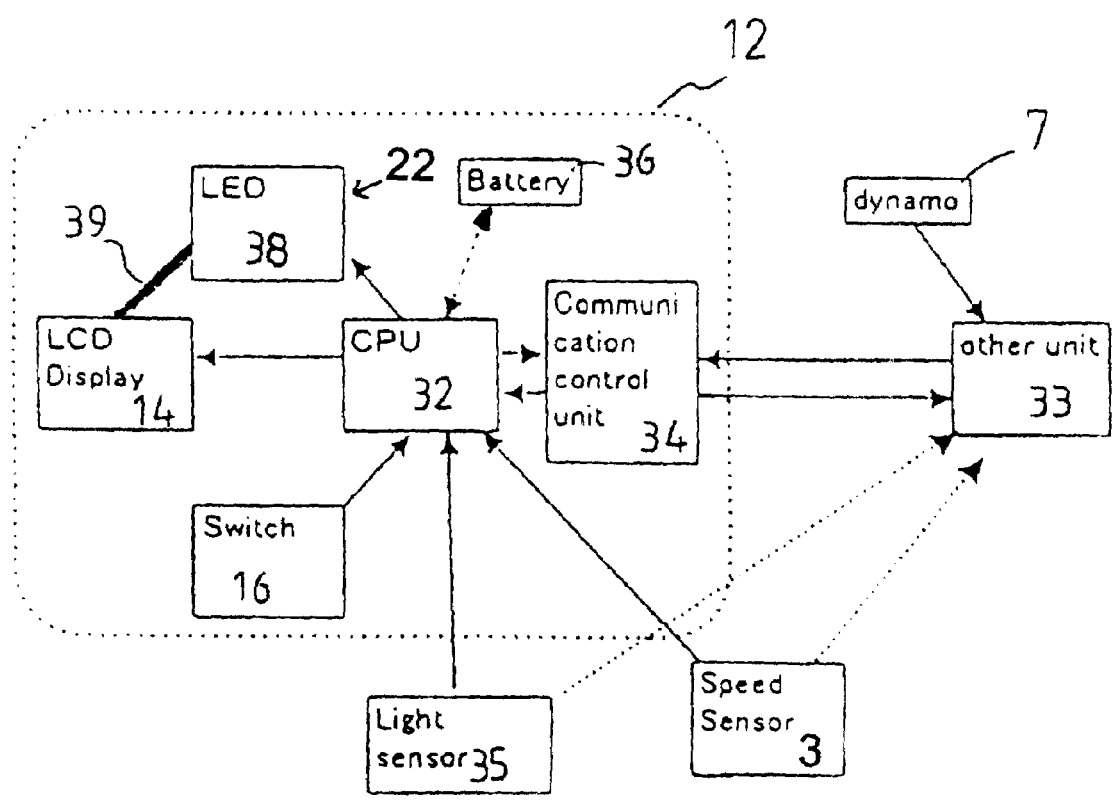
FIG. 8 is a block diagram of electrical components used with another embodiment of a cycle computer with an integrated lighting device.

FIG. 8 is a block diagram of electrical components used with another embodiment of a cycle computer 10 with an integrated lighting device 22. In this embodiment, the lighting device 22 comprises a plurality of LED elements 38. An optical coupling 39 is provided between the LED elements 38 and the display 14, e.g. in form of optical fibers, to provide back lighting of the LCD display 14.

Interconnecting the CPU 32 and the lighting device 22 with a battery 36 and/or dynamo 7 reduces the number of parts, simplifies wiring, and results in versatile operating modes and improved power efficiency. For example, the dynamo 7 generates a large amount of power when the bicycle is operated at high speed. In such cases, the common CPU 32 may charge the battery 36 with a part of the generated power, may use the generate power to calculate and display on LCD display 14 information derived from the light sensor 35, speed sensor 37 and or dynamo 7, and use the available power from the battery 36 and/or dynamo 7 to illuminate the lighting device 22 with different lighting levels. For example, if the cycling speed decreases, the desired area ahead of the bicycle that should be illuminated may be smaller, so the CPU 32 may lower the intensity of the light emitted by the lighting device 22 to accommodate the decreased amount of power from dynamo 7. Reducing the number of LED's 38 or lamps illuminated or reducing the power supplied to the lighting device 22 could accomplish this. If the bicycle comes to a stop, then the CPU 32 itself needs very little power. Accordingly, the CPU 32 may control the lighting device 22 based on the available energy stored in the battery 36. The lighting device 22 could be switched to a flashing mode such as random flashing of different lighting elements 38, common flashing etc. to reduce power consumption.

If the computer housing 12 is detachably mounted to the bicycle, and if a battery 36 is mounted within the computer housing 12, then the cycle computer 10 also could function as an independent light source away from the bicycle. Such an option also is available with the embodiment shown in FIG. 6, assuming the battery housing 9 is detachably mounted to the bicycle frame.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle lighting apparatus comprising:
   a computer housing adapted to be mounted to a bicycle;
   wherein the computer housing includes a front surface that faces primarily forwardly and not downwardly and a beveled portion extending rearwardly from the front surface;
   a computer housed within the computer housing;
   a lighting device housed within the computer housing, wherein the lighting device is controlled by the computer; and
   wherein the lighting device is housed at the beveled portion of the computer housing so that light emitted by the lighting device is directed primarily through the beveled portion forwardly outside of the computer housing.

2. The apparatus according to claim 1 further comprising a display housed within the computer housing, wherein the computer controls information provided on the display.

3. The apparatus according to claim 1 wherein the beveled portion is beveled downwardly.

4. The apparatus according to claim 3 wherein light emitted by the lighting device is directed downwardly outside of the housing.

5. A bicycle lighting apparatus comprising:
   a computer housing adapted to be mounted to a bicycle;
   a computer housed within the computer housing;
   a display housed within the computer housing, wherein the computer controls information provided on the display;
   a lighting device housed within the computer housing, wherein the lighting device is controlled by the computer; and
   wherein a same lighting device provides backlighting for the display as well as lighting outside of the computer housing.

6. The apparatus according to claim 5 wherein light emitted by the lighting device is directed forwardly outside of the computer housing.

7. A bicycle lighting apparatus comprising:
   a computer housing adapted to be mounted to a bicycle;
   a computer housed within the computer housing;
   a conduit coupler disposed on the computer housing for coupling a conduit from an externally mounted bicycle control device adapted to be mounted to a bicycle handlebar;
   a display housed within the computer housing and inclined rearwardly, wherein the computer controls information provided on the display;
   a lighting device housed within the computer housing, wherein the lighting device is controlled by the computer; and
   wherein light emitted by the lighting device is directed laterally outside of the computer housing.

8. The apparatus according to claim 7 wherein light emitted by the lighting device is directed forwardly outside of the computer housing.

* * * * *